(12) United States Patent
Zagorski et al.

(10) Patent No.: US 7,472,870 B2
(45) Date of Patent: Jan. 6, 2009

(54) CRYOGENIC CLAMP-ON PIPE ANCHOR

(75) Inventors: Kenneth L. Zagorski, Houston, TX (US); Joseph Donoghue, Houston, TX (US); Michael Bock, Houston, TX (US)

(73) Assignee: Rilco Manufacturing Company, Inc., Houston, TX (US)

( * ) Notice: Subject to any disclaimer, the term of this patent is extended or adjusted under 35 U.S.C. 154(b) by 0 days.

(21) Appl. No.: 10/844,090

(22) Filed: May 12, 2004

(65) Prior Publication Data

US 2005/0253024 A1 Nov. 17, 2005

(51) Int. Cl.
*F16L 3/08* (2006.01)

(52) U.S. Cl. .................. 248/65; 248/74.1; 248/74.4; 248/231.61; 403/312; 285/419; 138/108

(58) Field of Classification Search .............. 248/74.1, 248/74.4, 230.9, 49, 67.5, 231.61, 229.24, 248/316.1, 316.6, 316.5, 227.1, 227.3; 138/108, 138/113; 403/312, 335, 338; 285/419, 373, 285/367, 420

See application file for complete search history.

(56) References Cited

U.S. PATENT DOCUMENTS

| | | | | |
|---|---|---|---|---|
| 1,243,748 A * | 10/1917 | McMurtrie | ............... | 285/154.3 |
| 2,690,193 A * | 9/1954 | Smith | ........................... | 138/99 |
| 3,891,006 A | 6/1975 | Lee | ............................. | 138/106 |
| 3,980,262 A | 9/1976 | Lee | ............................... | 248/65 |
| 4,431,152 A * | 2/1984 | Reed, Jr. | ........................... | 248/65 |
| 4,804,158 A | 2/1989 | Collins et al. | .............. | 248/74.4 |
| 5,205,520 A * | 4/1993 | Walker | ...................... | 248/74.1 |
| 5,924,656 A | 7/1999 | Okada et al. | .................. | 248/73 |
| 6,431,502 B1 * | 8/2002 | Goodman | ................... | 248/74.1 |
| 6,729,588 B2 * | 5/2004 | Wilkinson, III | ............. | 248/74.1 |
| 2005/0116123 A1* | 6/2005 | Bailey et al. | ................ | 248/74.1 |

* cited by examiner

*Primary Examiner*—Kimberly T Wood
(74) *Attorney, Agent, or Firm*—Baker Botts L.L.P.

(57) ABSTRACT

A pipe anchor having: a base cradle with a lug; a top cradle with a lug and secured to the base cradle so as to encircle a pipe within the base cradle and the top cradle; a locking mechanism with opposite mating components attached to the base cradle and the top cradle; at least one lug attached to the pipe; and insulation material filling a space between the pipe and the cradles, wherein the insulation material engages the at least one lug of the pipe and the lugs of the cradles.

5 Claims, 11 Drawing Sheets

Section A-A

Section B-B

Section C-C

Section D-D

CRYOGENIC CLAMP-ON PIPE ANCHOR

BACKGROUND OF THE INVENTION

1. Field of the Invention

This invention relates to insulated pipes. In particular, this invention relates to insulated pipe anchors or restraints for insulated pipes.

2. Description of the Prior Art

Typically, prior art cryogenic pipe anchors are pre-assembled in a factory and delivered to the field with insulated pipe sections already contained within the anchor. The anchor housings are configured as a unitary cylindrical housing that encircles a pipe section and slipped over the end of a pipe section. With the housing and pipe section coaxially aligned, insulation material is injected into the annulus defined between the housing and the pipe section.

Other prior art anchors may be clamped onto the pipeline in the field. These clamp-on anchors have multi-section housings that are less stable than the unitary housings provided with pre-assembled housings. Prior art clamp-on anchor products did not address the issues of pipe rotation and aligning the top and bottom cradles. By not restricting the pipe rotation within the anchor, that pipe would rotate and translate the forces, which should have been contained by the anchor, to another location along the pipe. The housing sections too easily become misaligned with one another so that the majority of the axial forces in the pipeline acts upon only some portion of the housing.

There is a need for a clamp-on anchor that can be assembled to a pipeline in the field that positively aligns multiple housing sections and uniformly supports the pipeline against axial and rotational movements.

SUMMARY OF THE INVENTION

The present invention provides a clamp-on anchor that can be assembled to a pipeline in the field that positively aligns multiple housing sections and uniformly supports the pipeline against axial and rotational movements.

One aspect of the invention provides a method of anchoring a pipe with an anchor, the method having the following steps: (1) positioning the pipe within a base cradle of the anchor, wherein the pipe comprises at least one lug and the base cradle comprise at least one lug; (2) securing a top cradle of the anchor to the base cradle, wherein the securing comprises mating opposite components of a locking mechanism, and wherein the top cradle comprise at least one lug; and (3) inserting insulation material into a space between the pipe and the cradles, wherein the insulation material engages the at least one lug of the pipe and the at least one lugs of the cradles.

According to a further aspect of the invention, there is provided a pipe anchor having: a base cradle comprising a lug; a top cradle comprising a lug and secured to the base cradle so as to encircle a pipe within the base cradle and the top cradle; a locking mechanism comprising opposite mating components attached to the base cradle and the top cradle; at least one lug attached to the pipe; and insulation material filling a space between the pipe and the cradles, wherein the insulation material engages the at least one lug of the pipe and the lugs of the cradles.

Another aspect of the present invention provides a pipe anchor having: a base cradle comprising translational and rotational lugs; a support structure attached to the base cradle; a top cradle comprising translational and rotational lugs and secured to the base cradle so as to encircle a pipe within the base cradle and the top cradle; a locking mechanism comprising opposite mating components attached to the base cradle and the top cradle; at least one rotational lug and at least one translational lug attached to the pipe; and insulation material filling a space between the pipe and the cradles, wherein the insulation material engages the lugs of the pipe and the lugs of the cradles.

The objects, features, and advantages of the present invention will be readily apparent to those skilled in the art upon a reading of the description of the preferred embodiments which follows.

BRIEF DESCRIPTION OF THE FIGURES

The present invention is better understood by reading the following description of non-limitative embodiments with reference to the attached drawings wherein like parts of each of the several figures are identified by the same referenced characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
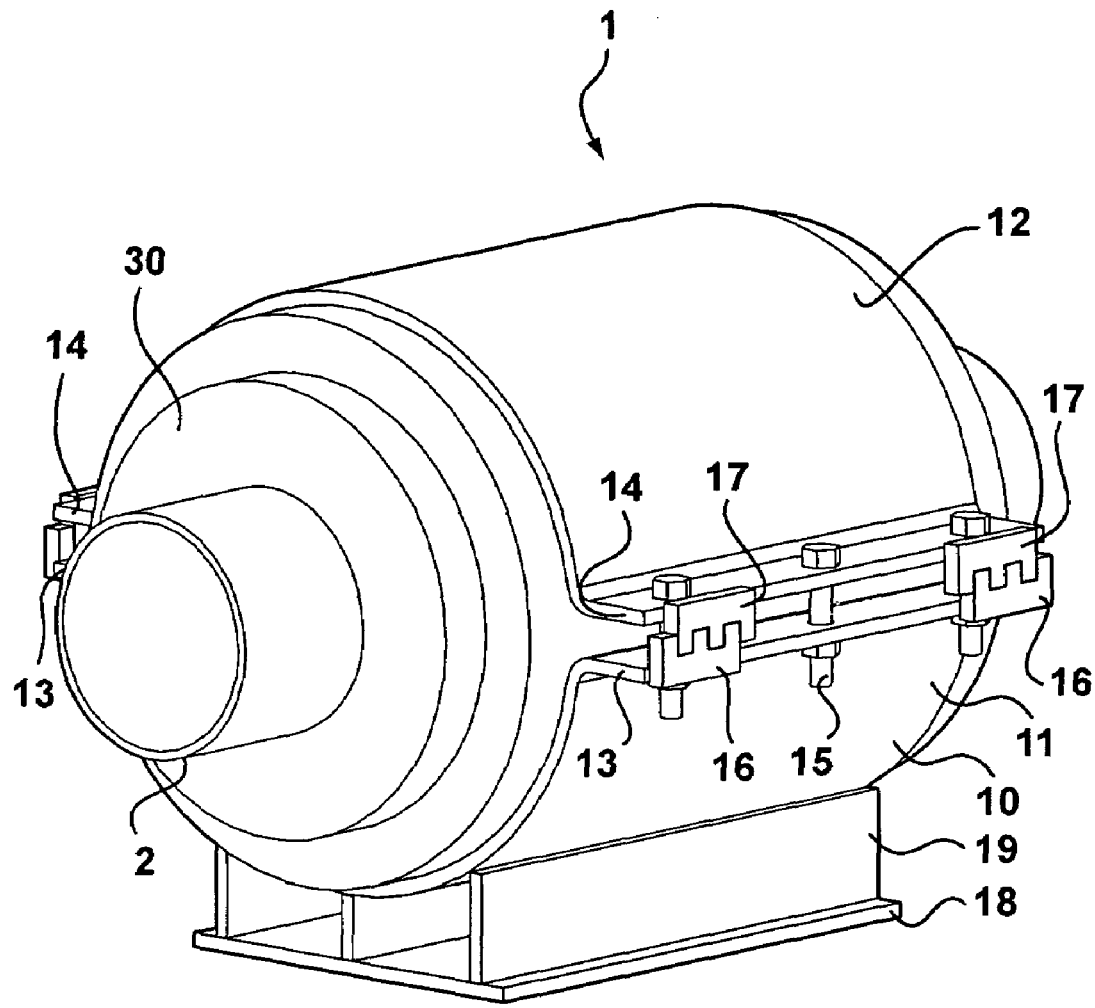
FIG. 1 is a perspective view of a clamp-on anchor having interlocking racks at the distal edges of connecting flanges between housing cradles.

Referring to FIG. 1, a perspective view of an anchor of the present invention as shown. The anchor 1 generally consist of a housing 10, a system of lugs 20 and insulation material 30, all of which surround and support a pipe section 2 (lugs 20 not shown). The housing 10 has a base cradle 11 and a top cradle 12. Each of these cradles are semi-circular in cross section and connect with each other to form a completely cylindrical housing structure that encircles the insulation material 30 and the pipe section 2. The base cradle 11 has a base flange or ear 13 on each side, which extends perpendicularly outward from the half-cylinder. Similarly, the top cradle 12 has a top flange or ear 14 on each side which extend perpendicularly outward from the half-cylinder. When the base cradle 11 and top cradle 12 are assembled to form a complete cylinder, the base flanges 13 are positioned adjacent the top flanges 14. A plurality of bolts 15 extend through holes in the flanges 13 and 14 to secure the base cradle 11 and top cradle 12.

The housing 10 also has an interlock mechanism between the base cradle 11 and the top cradle 12. In the embodiment shown in FIG. 1, the interlock mechanism consists of a base rack 16 and a top rack 17. Each of these racks has a set of square teeth extending from one end or edge of the rack. The base rack 16 is attached to the distal edge of the base flange 13 and oriented so that the teeth of the base rack 16 extend toward the top flange 14 of the top cradle 12. Similarly, the top rack 17 is attached to the distal edge of the top flange 14 and oriented so that its teeth extend toward the base flange 13 of the base cradle 11. The teeth of the base rack 16 mate with the teeth of the top rack 17. In the embodiment shown in FIG. 1, two base racks 16 and two top racks 17 are attached to each base flange 13 and to each top flange 14, respectively. The racks 16 and 17 interlock to ensure an equal axial force distribution to both the top and base cradles 12 and 11. The illustrated design of the interlocking racks 16 and 17 also allows for expansion and contraction of the pipe by use of a square tooth design that permits the cradle flanges to have a variable gap distance.

A base plate 18 is mounted to the base cradle 11 by a support structure 19. In this particular configuration, the support structure nineteen has three legs which extend perpendicularly from the base plate 18 to the base cradle 11. The base plate 18 is mountable to any structure such as concrete floors or wall, I-beam super structures, etc. While three legs and a base plate are illustrated, any suitable support structure may be attached to the top and/or base cradle, as is known in the art.

Figure 2:
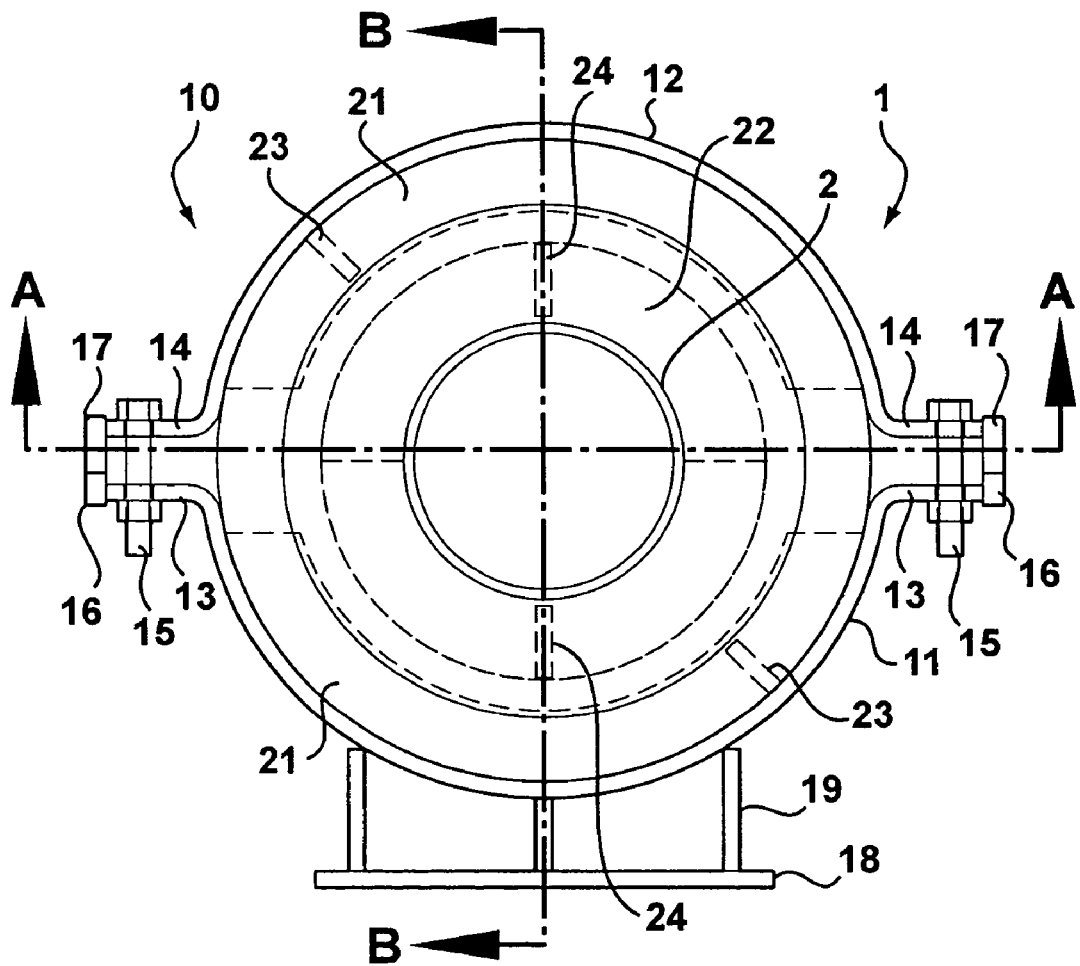
FIG. 2 is an end view of the clamp-on anchor shown in FIG. 1.

Referring to FIG. 2, an end view of the anchor 1 of FIG. 1 is shown. The base cradle 11 is supported by the base plate 18 and support structure 19. The top cradle 12 is attached to the base cradle 11 to form the cylindrical housing 10. Bolts 15 extend through the base flange 13 and the top flange 14 on each side to secure the top cradle 12 to the base cradle 11. The base racks 16 extend from the base flanges 13 and the top racks 17 extend from the top flanges 14 on each side of the housing 10. The base racks 16 and the top racks 17 extend toward each other and mate. As noted previously, the racks are located at the distal edges of the flanges.

FIG. 2 also shows interior structures between the housing 10 and the pipe section 2. Housing translation lugs 21 are attached to the base cradle 11 and top cradle 12. In particular, the housing translation lugs 21 are rainbow shaped ribs or flanges that extend perpendicularly from the interior of the cradles toward the pipe section 2. The housing translation lugs 21 extend around the cradle from about one flange to about the other flange. The housing translation lugs 21 extend radially inward toward the pipe section 2 from the housing 10 about one-third the distance between the housing 10 and the pipe section 2. Depending on the application, the height of the lugs may be more or less than one-third the distance between the housing 10 and the pipe section 2. In the embodiment illustrated, two housing translation lugs 21 are attached to the top cradle 12 and two housing translation lugs 21 are attached to the base cradle 11. The anchor 1 also has pipe translation lugs 22 that are attached to the pipe section 2. The pipe translation lugs 22 extend perpendicularly and radially outward from the pipe section 2. Thus, the pipe translation lugs 22 lie in a plane that is perpendicular to the longitudinal central axis of the pipe section 2. The pipe translation lugs 22 extend about one-third the distance from the pipe section 2 toward the housing 10. As shown in FIG. 2, the pipe translation lugs 22 extend 360° around the pipe section 2. The pipe translation lugs 22 are made from two halves that are placed on opposite sides of the pipe and welded to the pipe and to each other to form the complete lug. The lugs may be attached to the pipe by any means known to persons of skill.

Housing rotation lugs 23 are also components of the anchor 1, wherein these lugs extend perpendicularly inward from the base cradle 11 and top cradle 12. The housing rotation lugs 23 extend lengthwise across the anchor parallel to the longitudinal central axis of the pipe section 2. Thus, in FIG. 2, the housing rotation lugs 23 are shown in cross section. The anchor 1 also has pipe rotation lugs 24 that extend perpendicularly outward from the pipe section 2. The pipe rotation lugs 24 extend lengthwise across the pipe section 2 and are parallel to the longitudinal central axis of the pipe section 2. Thus, the pipe rotation lugs 24 are also shown in cross section in FIG. 2. The pipe rotation lugs 24 extend from the pipe section 2 toward the housing 10 about one-third the distance similar to the height of the pipe translation lugs 22. Depending on the application, the height of the lugs may be more or less than one-third the distance similar to the height of the pipe translation lugs 22.

In some embodiments of the invention, the rotation and translation lugs are connected to each other, by welding or any other means known to persons of skill. For example, the housing rotation lugs 23 may span the entire distance between two housing translation lugs 21 and be welded thereto. A similar configuration may be used to connect the pipe lugs. This configuration serves two purposes. First, it allows greater axial load carrying capability by the translation lugs than translation lugs that do not the extra support provided by attached rotation lugs. Second, the rotation lugs have greater pipe rotation load bearing capacity because the rotation lugs are supported by the translation lugs.

Figure 3:
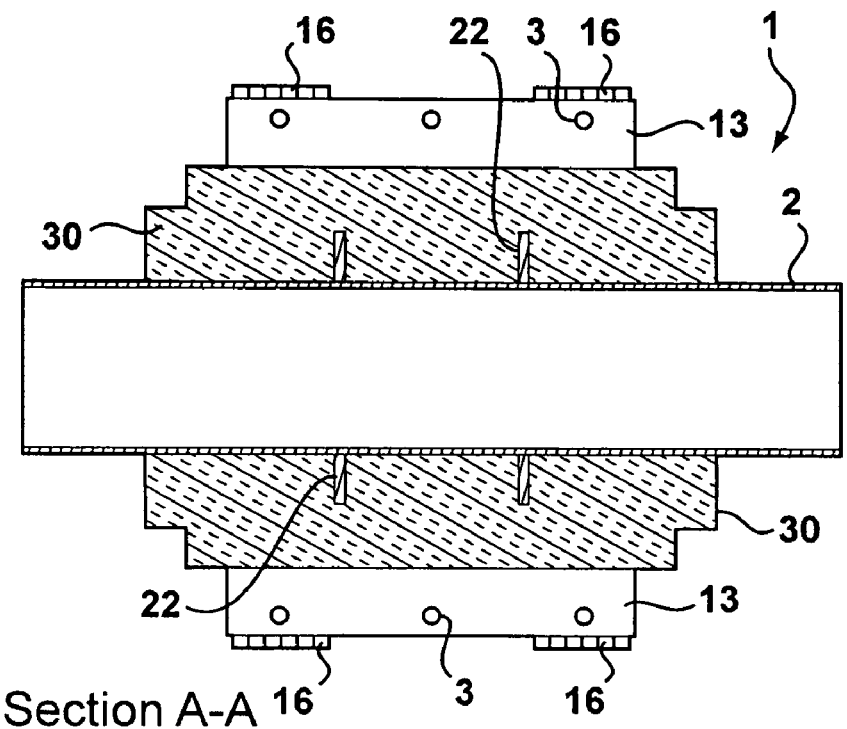
FIG. 3 is a cross-sectional, top view of the clamp-on anchor of FIGS. 1 and 2, taken along a horizontal, central plane indicated at A-A in FIG. 2.

FIG. 3 illustrates a cross-sectional, top view of the anchor 1 taken across a horizontal, central plane indicated at A-A in FIG. 2. The pipe section 2 is surrounded by insulation material 30. Since the housing 10 encircles the insulation material 30, in FIG. 3, base flanges 13 are shown extending from opposite sides of the anchor 1. Holes 3 are located in the base flanges 13 through which bolts 15 (not shown) extend. Two separate base racks 16 are shown attached to the distal edges of each of the base flanges 13. From the point of view shown in FIG. 3, the pipe translation lugs 22 are shown in cross section. In this embodiment of the anchor 1, two pipe translation lugs 22 are secured to the pipe section 2. The first pipe translation lug 22 is attached to the pipe section 2 at a position approximately one-third the length of the anchor 1. The second pipe translation lug 22 is secured to the pipe section 2 at a position approximately two-thirds the length of anchor 1.

Figure 4:
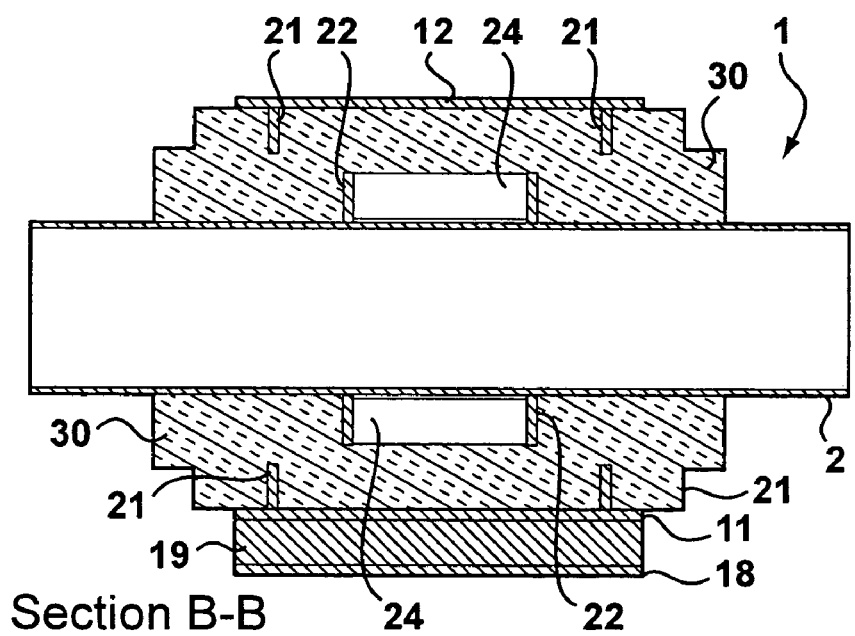
FIG. 4 is a cross-sectional, side view of the clamp-on anchor of FIGS. 1-3, taken along a vertical, central plane indicated at B-B in FIG. 2.

FIG. 4 illustrates a cross-sectional, side view of the anchor 1 taken along a central, vertical plane identified at B-B in FIG. 2. The base cradle 11 is shown supported by the support structure 19 and base plate 18. The top cradle 12 is shown opposite the base cradle 11. Insulation material 30 fills the space between the cradles 11 and 12 and the pipe section 2. Because the pipe translation lugs 22 extend 360° around the pipe section 2, the pipe translation lugs 22 are also visible in FIG. 4. As illustrated in FIGS. 3 and 4, the pipe translation lugs 22 extend perpendicularly from the pipe section 2 and extend about one-third the distance from the pipe section 2 to the cradles 11 and 12. Two pipe rotation lugs 24 are also illustrated in FIG. 4 on opposite sides of the pipe section 2. The pipe rotation lugs 24 extend along the pipe section 2 in a direction parallel to the longitudinal central axis of the pipe section 2. The pipe rotation lugs 24 extend from one pipe translation lug 22 to the other pipe translation lug 22. In this embodiment, the pipe rotation lugs 24 are attached to the pipe section 2 and to the pipe translation lugs 22.

FIG. 4 also illustrates cross sectional side views of the housing translation lugs 21. In this embodiment, the anchor 1 has four housing translation lugs 21. Two of the housing translation lugs 21 are attached to the base cradle 11 and two of the housing translation lugs 21 are attached to the top cradle 12. The housing translation lugs 21 lie in planes that are perpendicular to the longitudinal central axis of the pipe section 2. The housing translation lugs 21 are positioned within the anchor 1 near opposite ends of the anchor 1.

Figure 5:
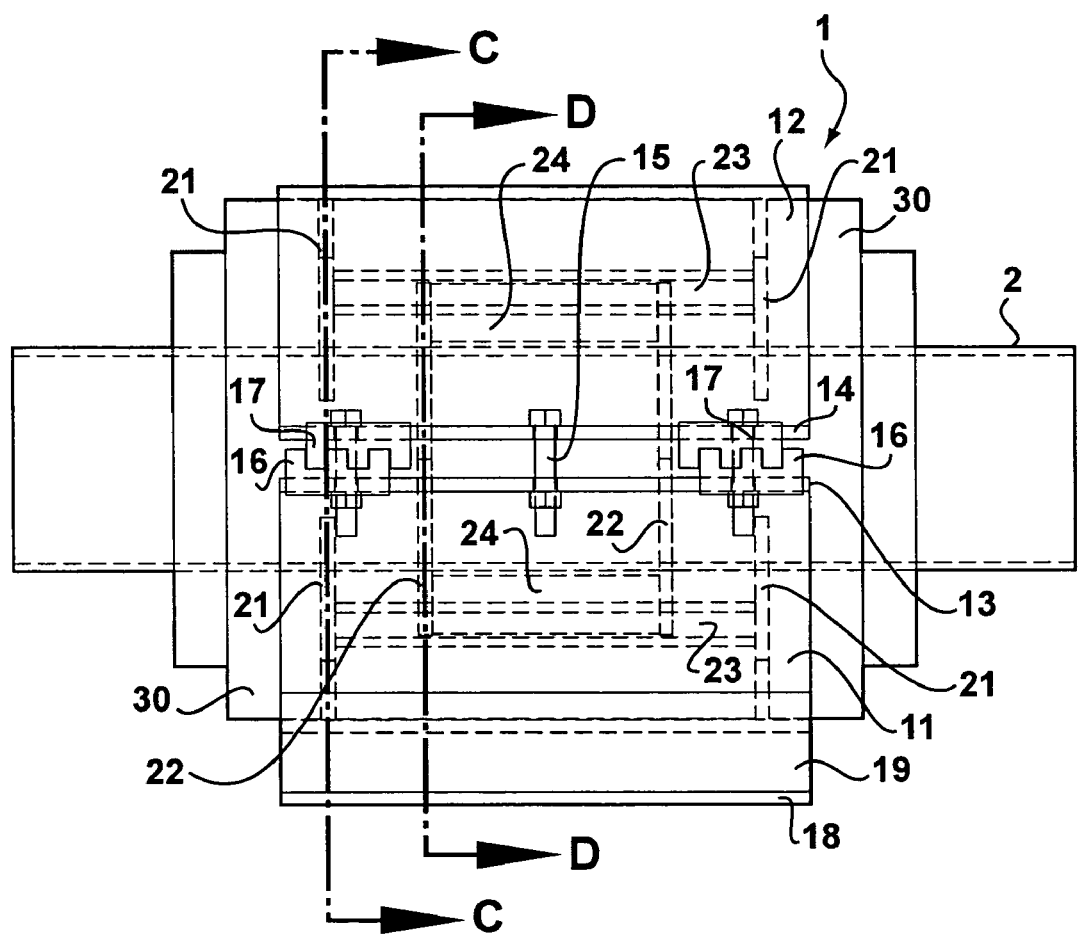
FIG. 5 is a side view of the clamp-on anchor of FIGS. 1-4.

FIG. 5 illustrates a side view of the anchor 1 shown in FIGS. 1-4. The pipe section 2 extends through the central portion of the anchor 1. The base cradle 11 is supported by the support structure 19 and base plate 18. The top cradle 12 is attached to the base cradle 11. Insulation material 30 fills the annular space between the pipe section 2 and the cradles 11 and 12. Base flange 13 and top flange 14 extend from the base cradle 11 and top cradle 12, respectively. Bolts 15 secure the flanges 13 and 14 to each other. Two base racks 16 are attached to the base flange 13 and two top racks 17 are attached to the top flange 14. The square teeth of the racks mate with each other.

Two housing translation lugs 21 are attached to the inside of the top cradle 12 and two housing translation lugs 21 are attached to the inside of the base cradle 11 as previously described. A housing rotation lug 23 extends between the housing translation lugs 21 of the top cradle 12. Similarly, a housing rotation lug 23 extends between the housing translation lugs 21 of the base cradle 11. Two pipe translation lugs 22 are attached to the pipe section 2. Further, two pipe rotation lugs 24 extend between the pipe translation lugs 22.

Figure 6:
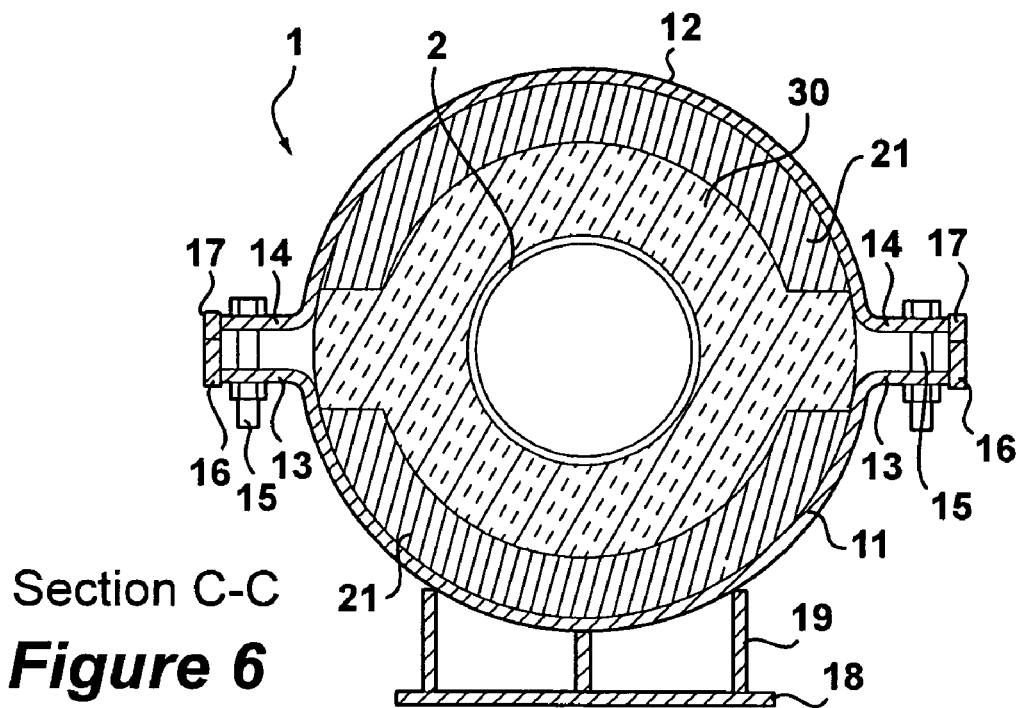
FIG. 6 is a cross-sectional end view of the clamp-on anchor of FIGS. 1-5 taken along a plane cut though housing translation lugs as indicated at C-C in FIG. 5.

FIG. 6 illustrates a cross-sectional, end view of the anchor 1 of FIG. 5 taken along a plane perpendicular to the central axis of the pipe section as indicated at C-C in FIG. 5. The base cradle 11 is supported by the support structure 19 and base plate 18. The top cradle 12 is attached to the base cradle 11 by top flanges 14 and base flanges 13. Bolts 15 extend through the flanges. Base racks 16 and top racks 17 also extend from the flanges 13 and 14. The racks 16 and 17 extend toward each other so that the teeth of the respective racks mate. Insulation material 30 fills the annular space between the cradles 11 and 12 and the pipe section 2. In the view illustrated in FIG. 6, the housing translation lugs 21 are clearly visible. The housing translation lugs 21 extend from the cradles 11 and 12 toward the pipe section 2 approximately one-third the distance from the cradles 11 and 12 to the pipe section 2. In this embodiment of the invention, the housing translation lugs 21 extend around the interior of the cradles and are just short of the flanges.

Figure 7:
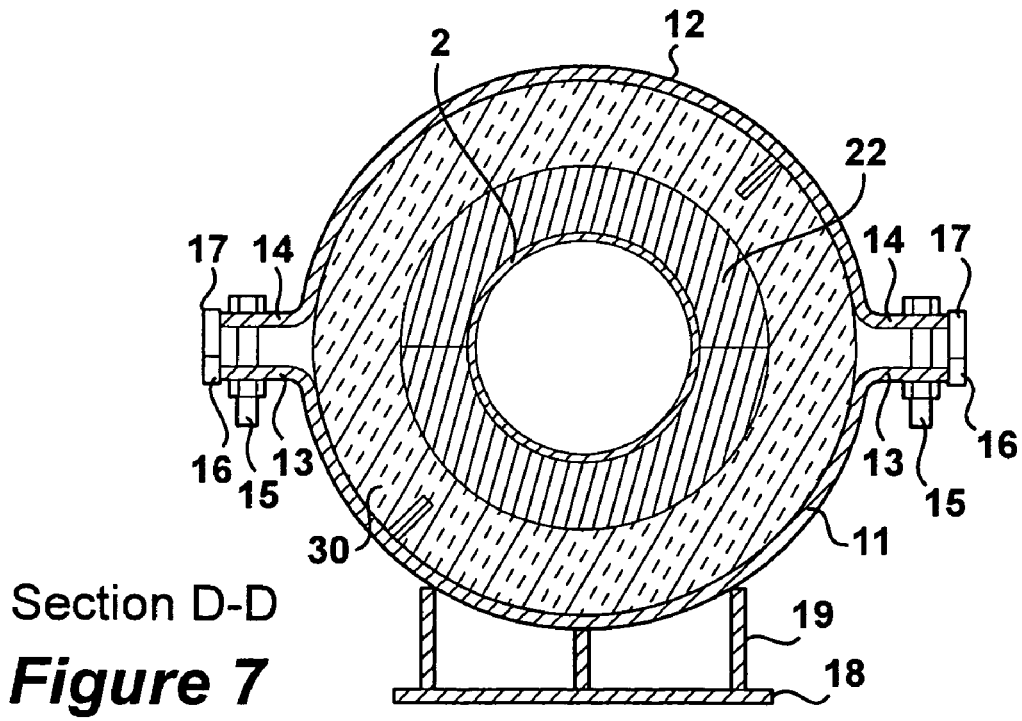
FIG. 7 is a cross-sectional end view of the clamp-on anchor of FIGS. 1-6 taken along a plane cut though a pipe translation lug as indicated at D-D in FIG. 5.

Referring to FIG. 7, this drawing shows a cross-sectional, end view of the anchor 1 of FIGS. 1-6 taken along a plane perpendicular to the longitudinal central axis of the pipe section 2 as indicated at D-D in FIG. 5. The base cradle 11 is supported by the support structure 19 and base plate 18. As previously described, the top cradle 12 is attached to the base cradle 11 by flanges 13 and 14, bolts 15, and racks 16 and 17. Insulation material 30 fills the annular space between the cradles 11 and 12 and the pipe section 2. One of the pipe translation lugs 22 is clearly visible in this view. It extends 360 degrees around the circumference of the pipe section 2. The pipe translation lugs may either be split in parts and assembled together on the pipe section 2 or they may be a whole, disc-shaped lug that is slipped over the end of the pipe section and slid along the pipe section 2 until it is attached in the correct position. The pipe housing lugs 22 may be assembled to the pipe section 2 by any means known to persons of skill.

Figure 8:
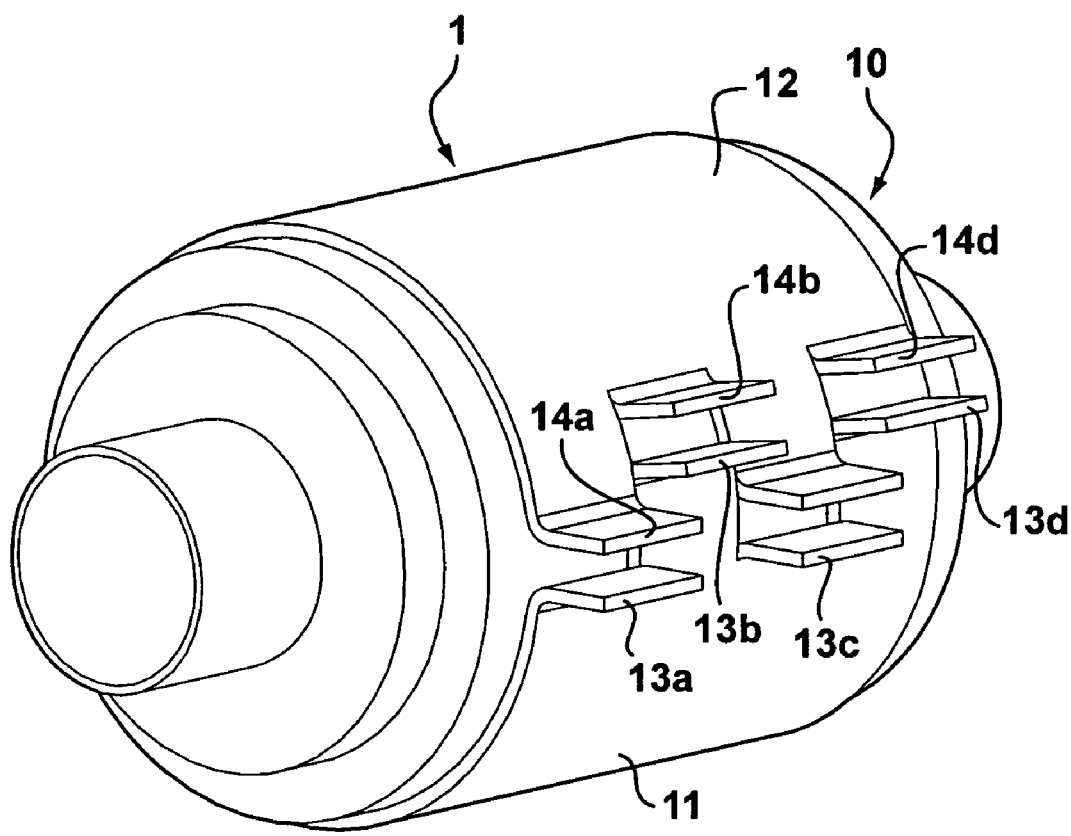
FIG. 8 is a perspective view of a clamp-on anchor having interlocking flanges that connect base and top cradles.

Referring to FIG. 8, a perspective view of an alternative housing 10 is illustrated. The anchor 1 has a base cradle 11 and top cradle 12 as previously described. However, in this embodiment, the flanges are divided into a plurality of smaller flanges. In particular, top flange 14 comprises flanges 14a, 14b, 14c, and 14d. The base flange is similarly divided into base flanges 13a, 13b, 13c, and 13d. Top flanges 14a and 14c extend from the top cradle 12 at a position at the furthest most end of the top cradle 12. Top flanges 14b and 14d extend from the top cradle 12 at a position relatively closer to the middle of the cradle. The staggered position of the top flanges 14a, 14b, 14c, and 14d cause a gap to exist between flanges 14a and 14c. Similarly, the flanges extending from the base cradle 11 are also staggered such that base flanges 13b and 13d extend from the base cradle 11 at the end of the cradle, while base flanges 13a and 13c extend from the cradle at a position closer to the middle of the base cradle 11. This staggered configuration creates a gap between base flanges 13b and 13d.

In this embodiment of the invention, the mated and staggered flanges are the locking mechanisms such that racks are omitted. When the base cradle 11 is mated with the top cradle 12, the staggered flanges intermingle such that base flange 13b is positioned within the gap between top flanges 14a and 14c. Similarly, top flange 14c is positioned in the gap between base flanges 13b and 13d. These flanges protrude into the gaps far enough to allow edges of the base and top cradles 11 and 12 to directly engage each other so as to lock the cradles together. Bolts 15 (not shown) may extend through the respective pairs of flanges to attach the cradles.

Figure 9:
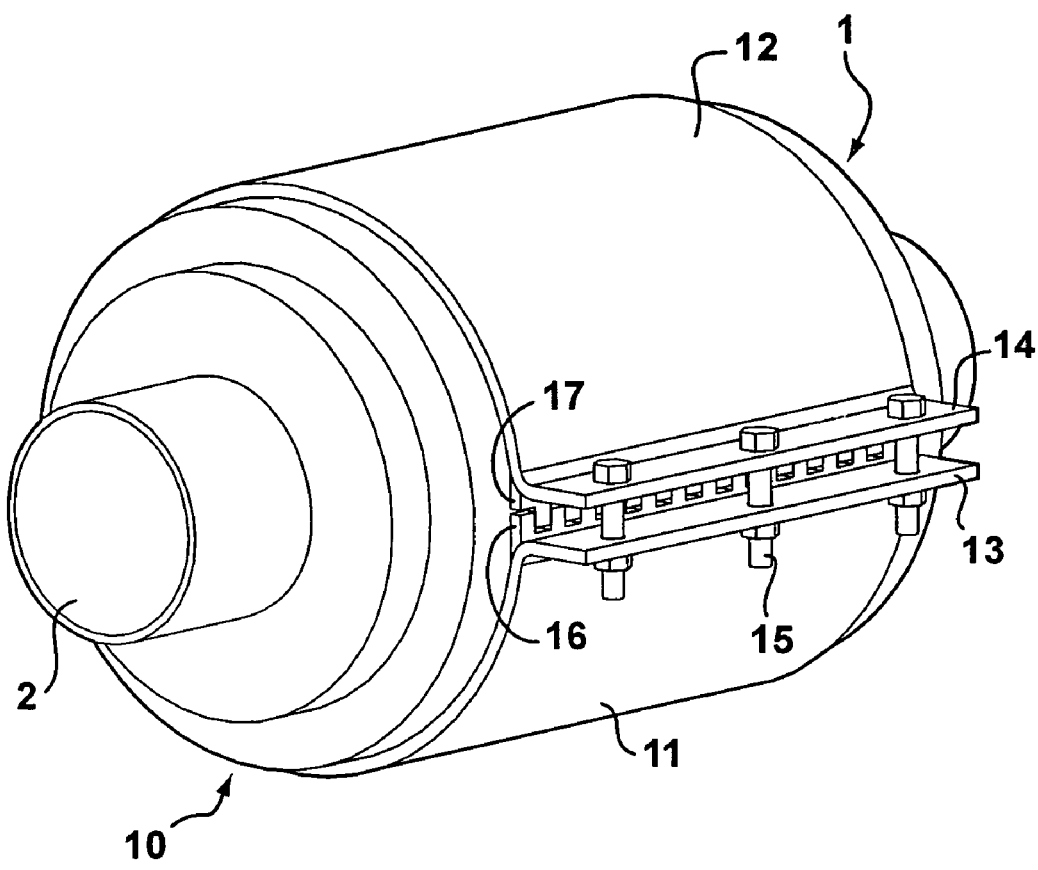
FIG. 9 is a perspective view of a clamp-on anchor having interlocking racks at the proximal ends of connecting flanges between housing cradles.

Referring to FIG. 9, a perspective view of an anchor of the present invention is illustrated. In this embodiment of the invention, the anchor 1 has a housing 10 consisting of a base cradle 11 and a top cradle 12. The cradles 11 and 12 are connected to each other by base and top flanges 13 and 14, respectively. Bolts 15 extend through the flanges 13 and 14 to connect the base cradle 11 to the top cradle 12. The connection between the cradles is further reinforced by base rack 16 and 17. These racks extend the entire length of the housing 10. Base rack 16 is positioned at the corner between the base cradle 11 and the base flange 13 (proximal end of the base flange 13). Similarly, the top rack 17 is positioned at the corner between the top cradle 12 and the top flange 14 (proximal end of the top flange 14). The base rack 16 and top rack 17 are oriented toward each other so that square teeth on the respective racks mate with each other. The square teeth to allow relative movement of the teeth into engagement and out of engagement in a tangential direction but allow very little relative movement between the racks 16 and 17 in a direction parallel to the longitudinal axis of the pipe section 2.

Figure 10A:
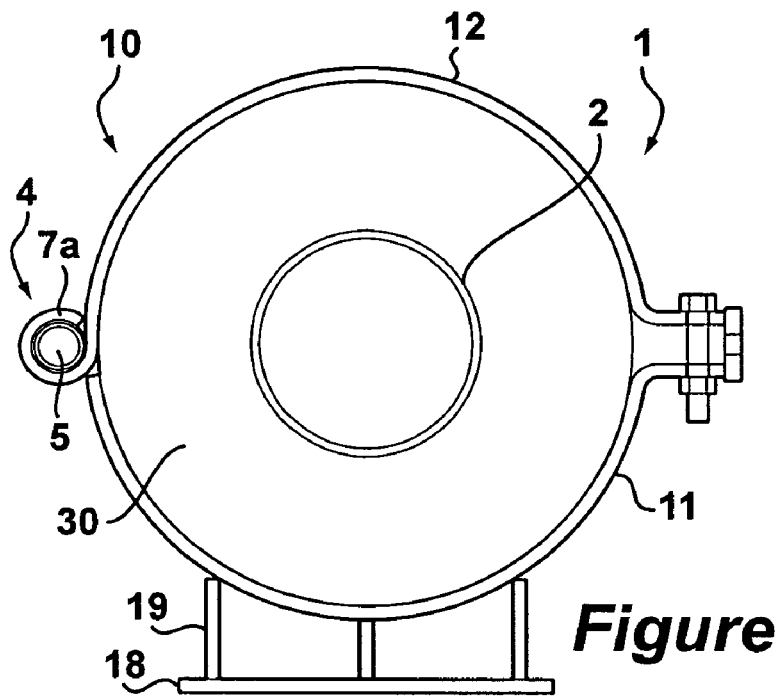
FIG. 10A is an end view of a clamp-on anchor having a hinge connection on one side of cradles and interlocking racks on the other side of the cradles.
Figure 10B:
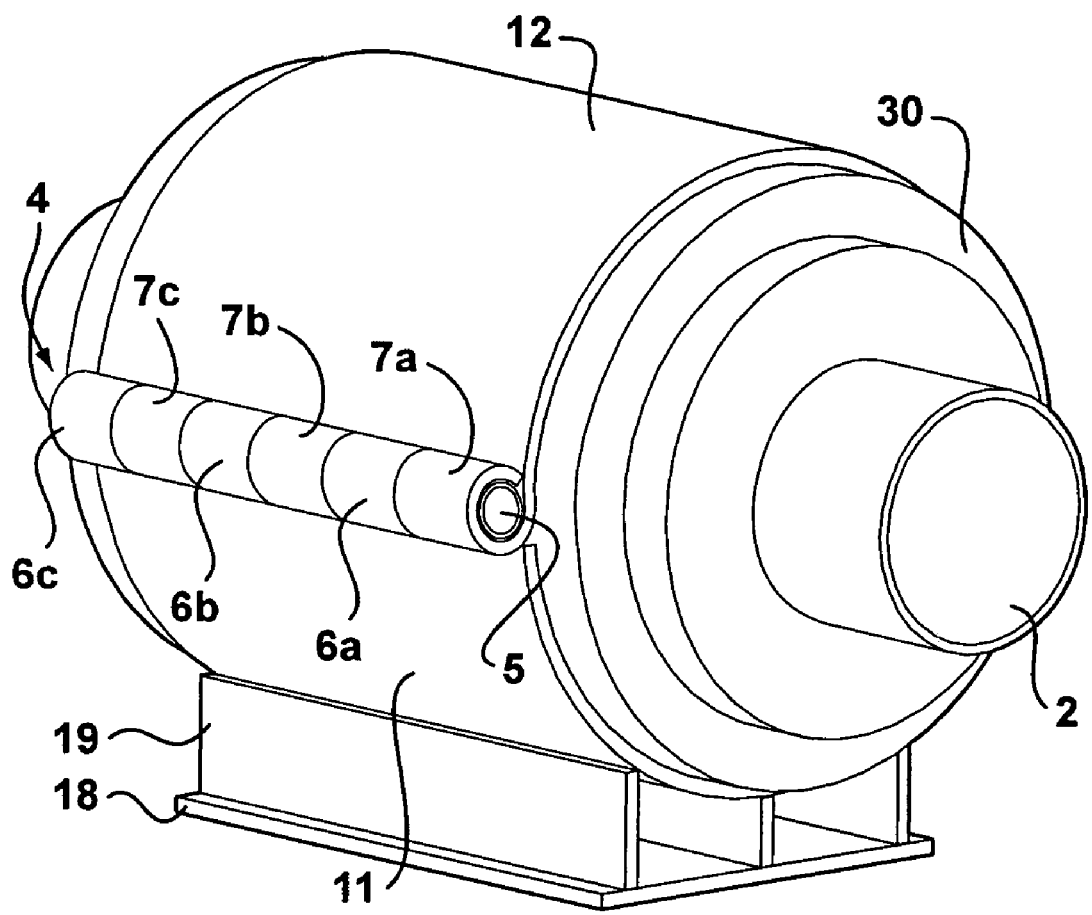
FIG. 10B is a perspective view of the clamp-on anchor shown in FIG. 10A.

Referring to FIG. 10A, an end view of an alternative anchor 1 is illustrated. A base plate 18 and support structure 19 support a base cradle 11. A top cradle 12 is attached to the base cradle 11 to form a cylindrical housing 10 that encircles insulation material 30 and pipe section 2. In this embodiment of the invention, the top cradle 12 and base cradle 11 are joined at one side by a hinge 4. As shown in FIGS. 10A and 10B, FIG. 10B being a perspective view of the anchor shown in FIG. 10A, the hinge 4 comprises several components. Top hinge curls 7a, 7b, and 7c extend from the top cradle 12. Similarly, base hinge curls 6a, 6b and 6c extend from the base cradle 11. The curls from each of the cradles are offset so that the curls from the opposite cradle are interposed between the curls of the same cradle. With the hinge curls mated together, a hinge pin 5 is inserted through all the hinge curls to complete the connection. Because the respective ends of the top hinge curls 7a, 7b and 7c directly engage the respective ends of the base hinge curls 6a, 6b and 6c, relative translational movement between the top and base cradles in a direction parallel to the longitudinal axis of the pipe section 2 is effectively eliminated.

While a hinge connection is used to connect one side of the cradles any other connection described herein may be used to connect the opposite side. One embodiment may have two hinge connections, one on each side. However, this embodiment restricts the anchors ability to expand and contract around the circumference of the anchor in response to temperature fluctuations.

Figure 11A:
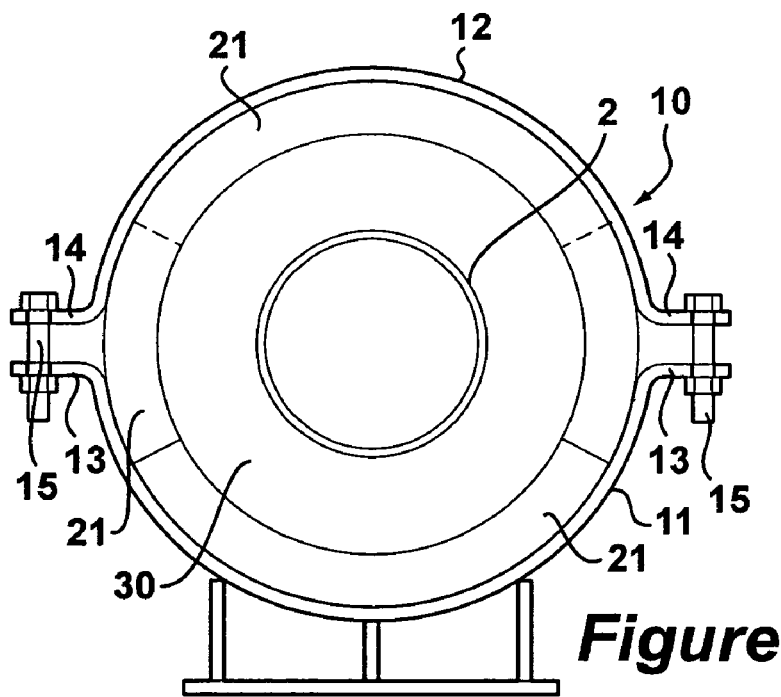
FIG. 11A is an end view of a clamp-on anchor having interlocking translation lugs mated between the cradles.

Referring to FIG. 11A, an end view of an anchor is illustrated. In this embodiment of the invention, a top cradle 12 is mounted to a base cradle 11 to encircle insulation material 30 and pipe section 2. Base flanges 13 extend from the base cradle 11 to connect with top flanges 14 by bolts 15. Rather than having a locking mechanism at the flanges, this embodiment of the invention uses the lugs to lock the top cradle 12 to the base cradle 11. In particular, this anchor 1 has housing translation lugs 21 which extend more than 180 degrees around the circumference of the housing 10. On opposite ends of the top cradle 12, the housing translation lug 21 extends beyond the top flange 14 on both sides. Similarly, the housing translation lug 21 attached to the base cradle 11 extends on both sides beyond the base flanges 13. Thus, the housing translation lug 21 attached to the base cradle 11 overlaps with the housing translation lug 21 attached to the top cradle 12.

Figure 11B:
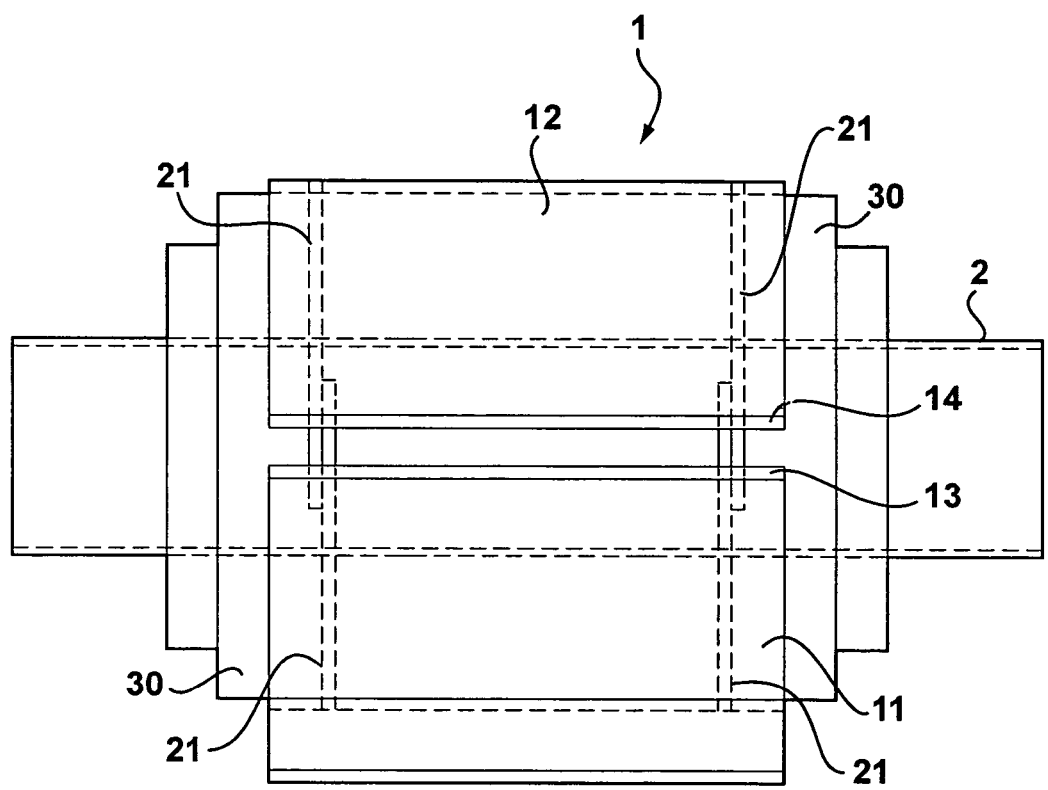
FIG. 11B is a side view of the clamp-on anchor shown in FIG. 11A.

Referring to FIG. 11B, a side view of the anchor illustrated in FIG. 11A is shown (the bolts 15 are omitted in this view for clarity). As previously described, the housing translation lugs 21 connected to the base cradle 11 extend up into the top cradle 12. Similarly, the housing translation lugs 21 attached to the top cradle 12 extend down into the base cradle 11. In this embodiment, the housing translation lugs 21 attached to the base cradle 11 are offset slightly toward the middle of the anchor 1 such that the outside surfaces of these housing translation lugs 21 directly engage the interior surfaces of the housing translation lugs attached to the top cradle 12. Because of the direct engagement between the housing translation lugs 21 of the base cradle 11 with the housing translation lugs 21 of the top cradle 12, relative translational movement in a direction parallel to the longitudinal axis of the pipe section 2 between the base cradle 11 and the top cradle 12 is restricted or eliminated.

In alternative embodiments of the invention, the various locking mechanisms are mixed and matched on opposite sides of the housing. Thus, depending on the particular application for the anchor, various combinations of attachment configurations are expressly considered part of the invention.

According to various embodiments of the invention, the base racks and top racks have square tooth configurations to engage or mate with each other at the connection between the base cradle and the top cradle. The engagement of these racks further limit relative translational movement between the pipe section 2 and the housing 10. Because the racks eliminate translational movement in the axial direction between the base cradle and top cradle, uniform support around the entire circumference of the housing is communicated through the insulation material 30 to the pipe section 2.

The housing 10 is adapted to receive a footing or support structure 19, if desired, so that the anchor and insulation arrangement of the present invention may be supported on an I-beam rather suitable support. After the lugs have been attached to the pipe section 2 and the housing 10 has been positioned there around, the annular space or void between the housing 10 and the pipe section 2 is filled with insulation material 30. Depending on a particular embodiment, the insulation material may be polyurethane, in particular having a density in the range of 4-30 pounds per cubic foot. Suitable forms may be employed at opposite ends of the anchor 1 to obtain the exact density and shape desired as is well known in the art. After the polyurethane has set, the forms may be removed.

When the insulation material 30 is injected into the annular space or void, it becomes bonded to the housing 10, the pipe section 2, and the lugs. It becomes embedded between and around the housing translation lugs 21, the pipe translation lugs 22, the housing rotation lugs 23 and the pipe rotation lugs 24. Thus, the insulation material 30 provides not only an insulation for the pipe section 2, but also provides an anchor for the pipe section 2 and inhibits relative movement of the pipe section 2 and housing 10. Because the insulation material 30 is a ridged, cellular type materials such as polyurethane, it has sufficient structural strength to prevent relative translational movement between the pipe section 2 and the housing 10 by engaging with the housing translation lugs 21 and the pipe translation lugs 22. Similarly, the insulation material 30 has sufficient structural strength to prevent or inhibit relative rotational movement between the pipe section 2 and the housing 10 by engaging with the housing rotation lugs 23 and the pipe rotation lugs 24. Because the housing lugs and pipe lugs do not contact one another, the anchor 1 serves to insulation the pipe section 2 because no noninsulative components extend the entire distance between the pipe section 2 and the housing 10. Thus, there are no heat loss conductors to undermine the insulative characteristic of the insulation material 30.

In some embodiments of the invention, the housing is manufactured from A-36 Carbon Steel and the pipe lugs are manufactured from the same material as the pipe section being anchored and insulated.

Figure 12:
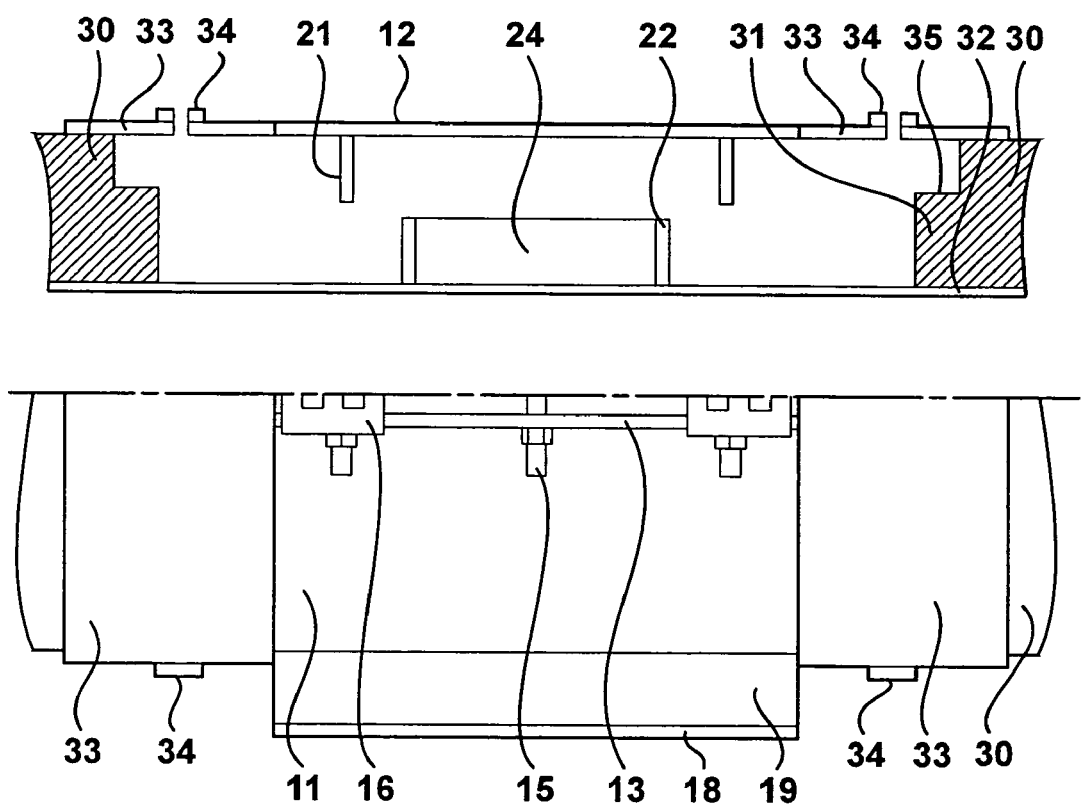
FIG. 12 is a side view of a clamp-on anchor and forms attached thereto illustrating an assembly process.

Depending on the particular application for the anchor, the anchor may be attached to a pipeline in the field. FIG. 12 illustrates a configuration for attaching an anchor to a completed pipeline in the field. The top half of FIG. 12 illustrates a cross-sectional, side view of an insulated pipeline and anchor before insulation is injected into the anchor. In the bottom half of FIG. 12, the same components are shown as an external, side view. Where the pipeline is already positioned in its desired location and pre-insulated, the anchor may be added by removing a section of insulation from the pipeline slightly larger than the length of the anchor. With insulation removed, pipe translation lugs 22 and pipe rotation lugs 24 are welded or otherwise attached to the exposed portion of the pipeline. As shown in FIG. 12, the exposed end portions of the insulation material 30 on the pipeline 32 are cut to have annular segments 31 protruding of the main body of insulation material 30. The annular segments 31 have a radial height from the pipeline about half the height of the main body of insulation material 30. Annular segments 31 are integrally formed in the insulation material 30 and extend from each end thereof as shown in FIG. 12. The housing 10 is then positioned around the exposed portion of the pipeline and bolts 15 are loosely used to connect the top and base cradles 12 and 11. Forms 33 are then wrapped around the open space between the housing 10 and the main body of the pipeline insulation material 30. Thus, two forms 33 are required, one on opposite ends of the housing 10. The forms 33 also have nipples 34 that allow access to the interior of the forms. Liquid insulation material is then injected through the nipples 34 into the annular space between the pipeline 32 and the housing 10 as well as under the forms 33 Several nipples 34 may be used to ensure even and complete distribution of the insulation material. Once the insulation material has set or solidified, the forms are removed and the bolts 15 (not shown) are tightened to fully engage the locking mechanism and squeeze the insulation material.

In alternative embodiments, an anchor is assembled with a pipeline by removing a portion of the insulation material from the pipeline. The pipe translation and rotation lugs are then welded or otherwise attached to the pipeline. Solid, preshaped blocks of insulation material are then positioned around the pipeline and the lugs so as to mate with the exposed insulation material remaining on the pipeline. In one embodiment of the invention, two 180 degree blocks of insulation material are cut to fit the housing and lugs. Any suitable type of adhesive may be applied to the abutting surfaces to seal the joints in the insulation material. The cradles of the anchor housing are then position around the blocks of insulation material and secured to each other. Any suitable type of adhesive may also be applied to the contact surfaces of the lugs, housing and insulation material.

The material flowing through pipe section 2 is at extremely low temperatures, such as by way of example only, negative 200° F and below. Substantial differences in temperature exists between the pipe section 2 and ambient temperature conditions. Some longitudinal movement of the pipe section 2 due to expansion and contraction through temperature fluctuations tend to separate insulation material 30 where it is connected or sealed at joints. Thus, the annular segments 31 provide a longer path along which the joint must separate. Further, the outside cylindrical segment surface 35 is always engaged with overlapping insulation at the joint, even if longitudinal separation occurs at the joint. Joints with annular segments 31 tend to inhibit passage of vapors from ambient to the pipe section 2 or pipeline 32. Because of the extreme difference in temperatures between the pipe and ambient, "icing" occurs when ambient vapors contact the pipe through a gap in the insulation material. Any separation between the insulation material at joints provides a path for vapors. Icing further destroys the seal and separates the insulation material. If icing becomes severe, fluid flow through the pipe section 2 must be terminated until the insulation material 30 is repaired.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A pipe anchor comprising:
a base cradle comprising a lug;
a top cradle comprising a lug and secured to the base cradle so as to encircle a pipe within the base cradle and the top cradle;
a locking mechanism comprising opposite mating components attached to the base cradle and the top cradle;
at least one lug capable of being attached to the pipe; and
insulation material filling a space between the pipe and the cradles, wherein the insulation material engages the at least one lug capable of being attached to the pipe and the lugs of the cradles, wherein the opposite mating components of the locking mechanism further comprise a base rack with square teeth and a top rack with square teeth matable with the square teeth of the base rack, wherein the base racks are positioned at distal ends of flanges protruding from the cradles.

2. A pipe anchor as claimed in claim 1, wherein the insulation material comprises material injected into the space between the pipe and the cradles, and solidified in the space, wherein the injected insulation material is bonded to the housing. pipe and lugs.

3. A pipe anchor as claimed in claim 1, wherein the inserting insulation material comprises solidified blocks of insulation material.

4. A pipe anchor as claimed in claim 1, wherein the lug of the base cradle comprises a rotation lug and a translation lug, and wherein the lug of the top base cradle comprises a rotation lug and a translation lug.

5. A pipe anchor comprising:
a base cradle comprising a lug;
a top cradle comprising a lug and secured to the base cradle so as to encircle a pipe within the base cradle and the top cradle;
a locking mechanism comprising opposite mating components attached to the base cradle and the top cradle;
at least one lug capable of being attached to the pipe; and
insulation material filling a space between the pipe and the cradles, wherein the insulation material engages the at least one lug capable of being attached to the pipe and the lugs of the cradles, wherein the opposite mating components of the locking mechanism further comprise a base rack with square teeth and a top rack with square teeth matable with the square teeth of the base rack, wherein the insulation material comprises material injected into the space between the pipe and the cradles, and solidified in the space, and wherein the lug of the base cradle comprises a rotation lug and a translation lug and wherein the lug of the top base cradle comprises a rotation lug and a translation lug wherein the base racks are positioned at distal ends of flanges protruding from the cradles.

* * * * *